United States Patent
Nicholson et al.

(10) Patent No.: US 10,079,500 B2
(45) Date of Patent: Sep. 18, 2018

(54) APPARATUS, METHOD, AND PROGRAM PRODUCT FOR POWERING A DEVICE USING A USB CONNECTION

(71) Applicant: LENOVO (Singapore) PTE. LTD., New Tech Park (SG)

(72) Inventors: John Weldon Nicholson, Cary, NC (US); Scott Edwards Kelso, Cary, NC (US); Jason A. Matteson, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 88 days.

(21) Appl. No.: 15/187,566

(22) Filed: Jun. 20, 2016

(65) Prior Publication Data

US 2017/0366028 A1    Dec. 21, 2017

(51) Int. Cl.
*H02J 7/00* (2006.01)
*H04L 12/10* (2006.01)

(52) U.S. Cl.
CPC ............ *H02J 7/0054* (2013.01); *H04L 12/10* (2013.01); *H02J 2007/0062* (2013.01); *H02J 2007/0096* (2013.01)

(58) Field of Classification Search
CPC ............. H02J 7/0054; H02J 2007/0062; H02J 2007/0096; H04L 12/10
See application file for complete search history.

(56) References Cited

U.S. PATENT DOCUMENTS

| 7,679,316 B2 * | 3/2010 | Guthrie ............... G06F 1/263 320/107 |
| 2015/0244185 A1 * | 8/2015 | Won ................... G06F 1/266 320/103 |
| 2015/0256017 A1 | 9/2015 | Hays et al. |

OTHER PUBLICATIONS

"PD Message Sequence Examples" USB Power Delivery Specification Revision 2.0 Version 1.1, pp. 508-531.

* cited by examiner

*Primary Examiner* — Vuthe Siek
(74) *Attorney, Agent, or Firm* — Kunzler, PC (57) ABSTRACT

Apparatuses, methods, and program products are disclosed for powering a device using a universal serial bus ("USB") connection. One apparatus includes a processor, and a memory that stores code executable by the processor. The code is executable by the processor to: detect a USB connection between a first device and a second device; determine to provide power between the first device and the second device via the USB connection based on information transmitted between the first device and the second device; select a direction to provide power between the first device and the second device based on the information transmitted between the first device and the second device; and control power to be provided between the first device and the second device after determining to provide power and selecting the direction to provide power.

20 Claims, 6 Drawing Sheets

APPARATUS, METHOD, AND PROGRAM PRODUCT FOR POWERING A DEVICE USING A USB CONNECTION

BACKGROUND

Field

The subject matter disclosed herein relates to a universal serial bus ("USB") connection and more particularly relates to powering a device using a USB connection.

Description of the Related Art

Information handling devices, such as desktop computers, laptop computers, tablet computers, smart phones, optical head-mounted display units, smart watches, televisions, streaming devices, etc., are ubiquitous in society. These information handling devices may be battery powered. Battery powered devices may have insufficient power when operation of the devices is desired.

BRIEF SUMMARY

An apparatus for powering a device using a USB connection is disclosed. A method and computer program product also perform the functions of the apparatus. In one embodiment, the apparatus includes a processor, and a memory that stores code executable by the processor. The code, in various embodiments, is executable by the processor to detect a universal serial bus ("USB") connection between a first information handling device and a second information handling device. In a further embodiment, the code is executable by the processor to determine to provide power between the first information handling device and the second information handling device via the USB connection based on information transmitted between the first information handling device and the second information handling device. In some embodiments, the information transmitted between the first information handling device and the second information handling device includes information selected from the group including a battery level, a remaining time of operation, a type of power source, a running application, an efficiency, a battery cycle count, a warranted cycle count, and a priority. The code, in some embodiments, is executable by the processor to select a direction to provide power between the first information handling device and the second information handling device based on the information transmitted between the first information handling device and the second information handling device. In certain embodiments, the code is executable by the processor to control power to be provided between the first information handling device and the second information handling device after determining to provide power and selecting the direction to provide power.

In some embodiments, the code executable by the processor determines to provide power between the first information handling device and the second information handling device via the USB connection by detecting a low battery level of the first information handling device. In one embodiment, the code executable by the processor determines to provide power between the first information handling device and the second information handling device via the USB connection by determining charging requirements of the first information handling device.

In another embodiment, the code executable by the processor selects to provide power in the direction from the first information handling device to the second information handling device. In some embodiments, the code executable by the processor selects to provide power in the direction from the second information handling device to the first information handling device.

A method for powering a device using a USB connection, in one embodiment, includes detecting, by use of a processor, a USB connection between a first information handling device and a second information handling device. In some embodiments, the method includes determining to provide power between the first information handling device and the second information handling device via the USB connection based on information transmitted between the first information handling device and the second information handling device. In some embodiments, the information transmitted between the first information handling device and the second information handling device includes information selected from the group including a battery level, a remaining time of operation, a type of power source, a running application, an efficiency, a battery cycle count, a warranted cycle count, and a priority. In a further embodiment, the method includes selecting a direction to provide power between the first information handling device and the second information handling device based on the information transmitted between the first information handling device and the second information handling device. In certain embodiments, the method includes controlling power to be provided between the first information handling device and the second information handling device after determining to provide power and selecting the direction to provide power.

In some embodiments, determining to provide power between the first information handling device and the second information handling device via the USB connection includes receiving a request for power from the first information handling device. In various embodiments, determining to provide power between the first information handling device and the second information handling device via the USB connection includes receiving an offer for power from the first information handling device. In one embodiment, determining to provide power between the first information handling device and the second information handling device via the USB connection includes detecting a low battery level of the first information handling device.

In some embodiments, determining to provide power between the first information handling device and the second information handling device via the USB connection includes detecting a low estimated remaining time of operation of the first information handling device. In certain embodiments, determining to provide power between the first information handling device and the second information handling device via the USB connection includes determining the type of power source of the first information handling device. In various embodiments, determining to provide power between the first information handling device and the second information handling device via the USB connection includes determining the running application on the first information handling device. In one embodiment, determining to provide power between the first information handling device and the second information handling device via the USB connection includes determining the efficiency of the first information handling device. In some embodiments, determining to provide power between the first information handling device and the second information handling device via the USB connection includes determining the battery cycle count and the warranted cycle count of the first information handling device. In various embodiments, determining to provide power between the first information handling device and the second information handling device via the USB connection includes determining a priority difference between the first information handling device and the second information handling device.

In certain embodiments, determining to provide power between the first information handling device and the second information handling device via the USB connection includes determining charging requirements of the first information handling device. In some embodiments, selecting the direction to provide power between the first information handling device and the second information handling device includes selecting to provide power in the direction from the first information handling device to the second information handling device. In various embodiments, selecting the direction to provide power between the first information handling device and the second information handling device includes selecting to provide power in the direction from the second information handling device to the first information handling device. In one embodiment, controlling power to be provided between the first information handling device and the second information handling device includes configuring the first and second information handling devices for providing power.

In certain embodiments, determining to provide power between the first information handling device and the second information handling device via the USB connection includes determining conditional criteria for providing power between the first information handling device and the second information handling device. In such embodiments, determining the conditional criteria for providing power between the first information handling device and the second information handling device includes determining an action to be performed on the first information handling device before the second information handling device will provide power to the first information handling device.

In one embodiment, a program product includes a computer readable storage medium that stores code executable by a processor. The executable code, in certain embodiments, includes code to perform detecting a USB connection between a first information handling device and a second information handling device. In a further embodiment, the executable code includes code to perform determining to provide power between the first information handling device and the second information handling device via the USB connection based on information transmitted between the first information handling device and the second information handling device. In some embodiments, the information transmitted between the first information handling device and the second information handling device includes information selected from the group including a battery level, a remaining time of operation, a type of power source, a running application, an efficiency, a battery cycle count, a warranted cycle count, and a priority. The executable code, in some embodiments, includes code to perform selecting a direction to provide power between the first information handling device and the second information handling device based on the information transmitted between the first information handling device and the second information handling device. In certain embodiments, the executable code includes code to perform controlling power to be provided between the first information handling device and the second information handling device after determining to provide power and selecting the direction to provide power.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
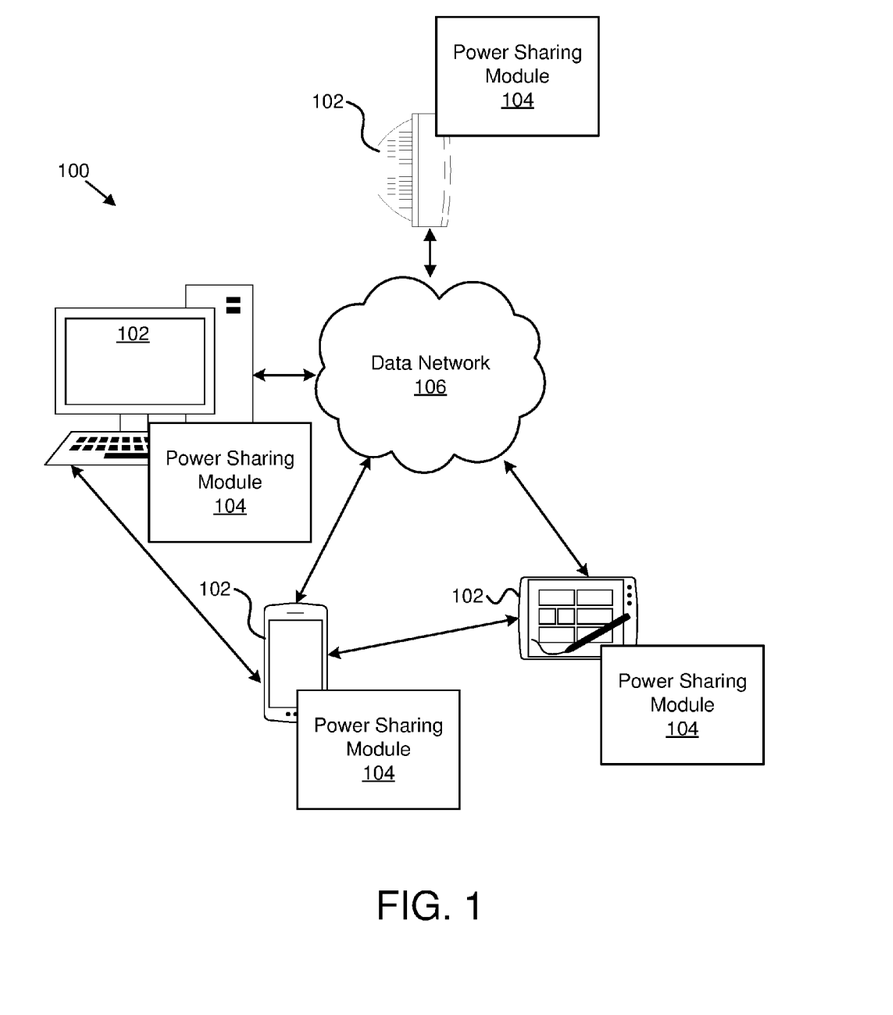
FIG. 1 is a schematic block diagram illustrating one embodiment of a system for powering a device using a USB connection.

FIG. 1 depicts one embodiment of a system 100 for powering a device using a USB connection. In one embodiment, the system 100 includes information handling devices 102, power sharing modules 104, and data networks 106. Even though a specific number of information handling devices 102, power sharing modules 104, and data networks 106 are depicted in FIG. 1, one of skill in the art will recognize that any number of information handling devices 102, power sharing modules 104, and data networks 106 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the information handling devices 102 include wearable devices, such as smart watches, fitness bands, optical head-mounted displays, or the like. The information handling devices 102 may access the data network 106 directly using a network connection. In various embodiments, the information handling devices 102 may communicate and/or share power directly with one another.

The information handling devices 102 may include an embodiment of the power sharing module 104. In certain embodiments, the power sharing module 104 may detect a USB connection between a first information handling device (e.g., information handling device 102) and a second information handling device (e.g., information handling device 102). The power sharing module 104 may determine to provide power between the first information handling device and the second information handling device via the USB connection based on information transmitted between the first information handling device and the second information handling device. The information transmitted between the first information handling device and the second information handling device may include information selected from the group including a battery level, a remaining time of operation, a type of power source, a running application, an efficiency, a battery cycle count, a warranted cycle count, and a priority. The power sharing module 104 may also select a direction to provide power between the first information handling device and the second information handling device based on the information transmitted between the first information handling device and the second information handling device. The power sharing module 104 may control power to be provided between the first information handling device and the second information handling device after determining to provide power and selecting the direction to provide power. In this manner, the power sharing module 104 may be used to share power from the first information handling device to the second information handling device and/or to share power from the second information handling device to the first information handling device.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
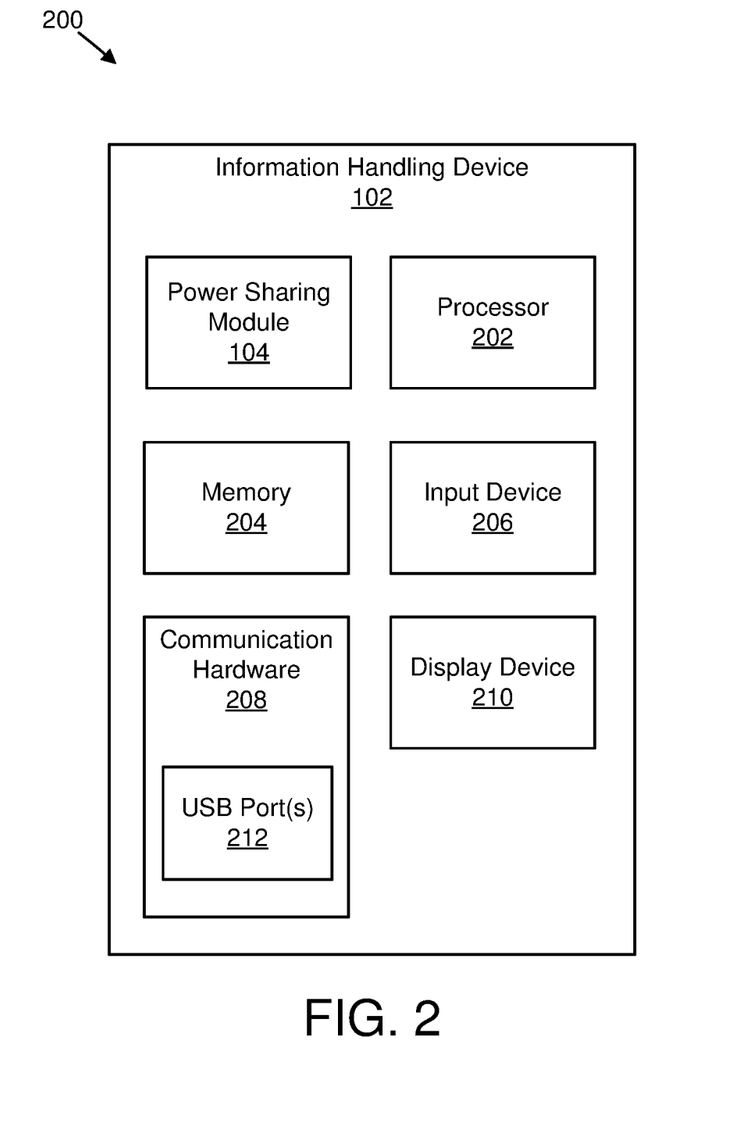
FIG. 2 is a schematic block diagram illustrating one embodiment of an apparatus including an information handling device.

FIG. 2 depicts one embodiment of an apparatus 200 that may be used for powering a device using a USB connection. The apparatus 200 includes one embodiment of the information handling device 102. Furthermore, the information handling device 102 may include the power sharing module 104, a processor 202, a memory 204, an input device 206, communication hardware 208, and a display device 210. The communication hardware 208 may include one or more USB Port(s) 212. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the power sharing module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to powering a device using a USB connection. In some embodiments, the memory 204 also stores program code and related data, such as an operating system or other controller algorithms operating on the information handling device 102.

The information handling device 102 may use the power sharing module 104 for powering a device using a USB connection. As may be appreciated, the power sharing module 104 may include computer hardware, computer software, or a combination of both computer hardware and computer software. For example, the power sharing module 104 may include circuitry, or a processor, used to determine to perform powering a device using a USB connection. As another example, the power sharing module 104 may include computer program code that determines to provide power.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The communication hardware 208 may facilitate communication with other devices. For example, the communication hardware 208 may enable communication via Bluetooth®, Wi-Fi, and so forth. The communication hardware 208 includes one or more USB port(s) 212 for coupling the information handling device 102 with another device using a USB connection (e.g., USB cable) coupled between one or more of the USB port(s) 212 of the information handling device 102 and another device. In one embodiment, the USB connection may have USB type C connectors on one or more ends to facilitate direct connection between two devices. For example, the USB connection may have USB type C connectors on both ends to connect the USB connection to two devices.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime) upon a change in power sharing. In some embodiments, the display device 210 includes one or more haptic devices for producing vibrations, motion, or other haptic feedback. For example, the display device 210 may produce haptic feedback upon power sharing.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the power sharing module 104.

Figure 3:
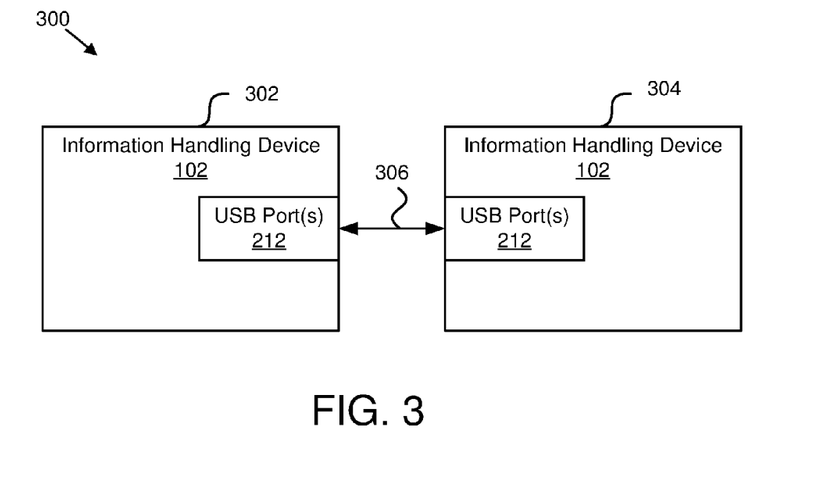
FIG. 3 is a schematic block diagram illustrating another embodiment of a system for powering a device using a USB connection.

FIG. 3 depicts another embodiment of a system 300 for powering a device using a USB connection. The system 300 includes a first information handling device 102, 302 and a second information handling device 102, 304. A USB cable 306 (e.g., USB connection) is coupled to the one or more USB port(s) 212 of the first information handling device 102, 302 and the one or more USB port(s) 212 of the second information handling device 102, 304. The USB cable 306 enables communication between the first information handling device 102, 302 and the second information handling device 102, 304. Furthermore, the USB cable 306 enables power to be provided between the first information handling device 102, 302 and the second information handling device 102, 304. In certain embodiments, power may be provided from the first information handling device 102, 302 to the second information handling device 102, 304. In some embodiments, power may be provided from the second information handling device 102, 304 to the first information handling device 102, 302. In one example, the first information handling device 102, 302 and the second information handling device 102, 304 are both desktop computers or laptop computers. In another example, the first information handling device 102, 302 and/or the second information handling device 102, 304 include one or more of a desktop computer, a laptop computer, a tablet computer, a single function device, a smart phone, a keyboard, a mouse, a printer, a display, an accessory, and so forth.

Figure 4:
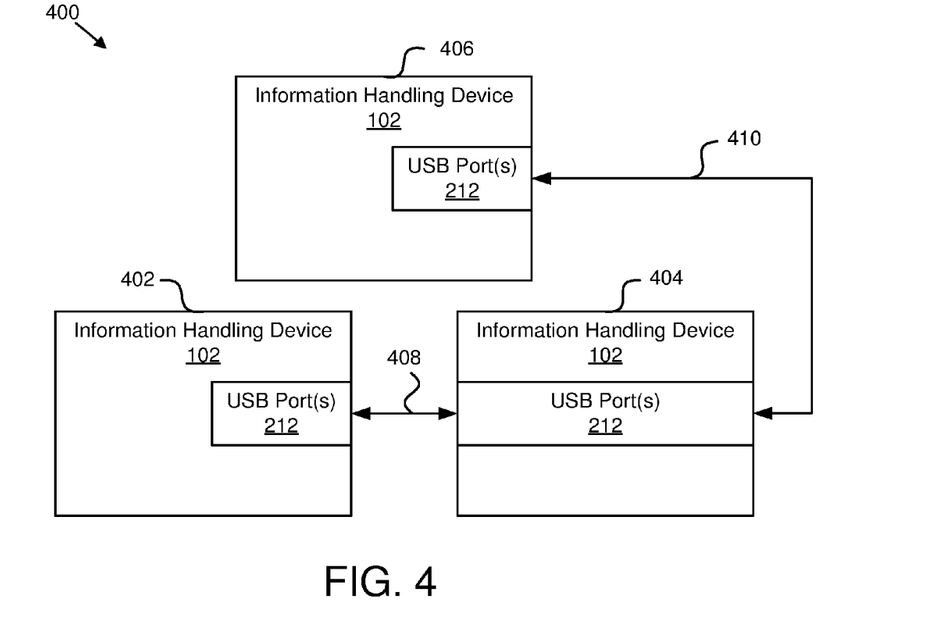
FIG. 4 is a schematic block diagram illustrating a further embodiment of a system for powering a device using a USB connection.

FIG. 4 depicts a further embodiment of a system 400 for powering a device using a USB connection. The system 400 includes a first information handling device 102, 402, a second information handling device 102, 404, and a third information handling device 102, 406. Any of the first information handling device 102, 402, the second information handling device 102, 404, and the third information handling device 102, 406 may be powered by connection to an external power source (e.g., wall outlet). A first USB cable 408 (e.g., USB connection) is coupled to the one or more USB port(s) 212 of the first information handling device 102, 402 and the one or more USB port(s) 212 of the second information handling device 102, 404. The first USB cable 408 enables communication between the first information handling device 102, 402 and the second information handling device 102, 404. Furthermore, the first USB cable 408 enables power to be provided between the first information handling device 102, 402 and the second information handling device 102, 404.

A second USB cable 410 (e.g., USB connection) is coupled to the one or more USB port(s) 212 of the second information handling device 102, 404 and the one or more USB port(s) 212 of the third information handling device 102, 408. The second USB cable 410 enables communication between the second information handling device 102, 404 and the third information handling device 102, 406. Furthermore, the second USB cable 410 enables power to be provided between the second information handling device 102, 404 and the third information handling device 102, 406. It should be noted that, in certain embodiments, power may be provided between the first information handling device 102, 402 and the third information handling device 102, 406 using the first USB cable 408 and the second USB cable 410 with the one or more USB port(s) 212 of the second information handling device 102, 404 bridging power transfer between the first and second USB cables 408, 410.

In certain embodiments, power may be provided from the first information handling device 102, 402 to the second information handling device 102, 404. In some embodiments, power may be provided from the second information handling device 102, 404 to the first information handling device 102, 402. In various embodiments, power may be provided from the first information handling device 102, 402 to the third information handling device 102, 406. In one embodiment, power may be provided from the third information handling device 102, 406 to the first information handling device 102, 402. In certain embodiments, power may be provided from the second information handling device 102, 404 to the third information handling device 102, 406. In some embodiments, power may be provided from the third information handling device 102, 406 to the second information handling device 102, 404.

In one example, the first information handling device 102, 402, the second information handling device 102, 404, and the third information handling device 102, 406 are all desktop computers or laptop computers. In another example, the first information handling device 102, 402, the second information handling device 102, 404, and/or the third information handling device 102, 406 include one or more of a desktop computer, a laptop computer, a tablet computer, a single function device, a smart phone, a keyboard, a mouse, a printer, a display, an accessory, and so forth.

Figure 5:
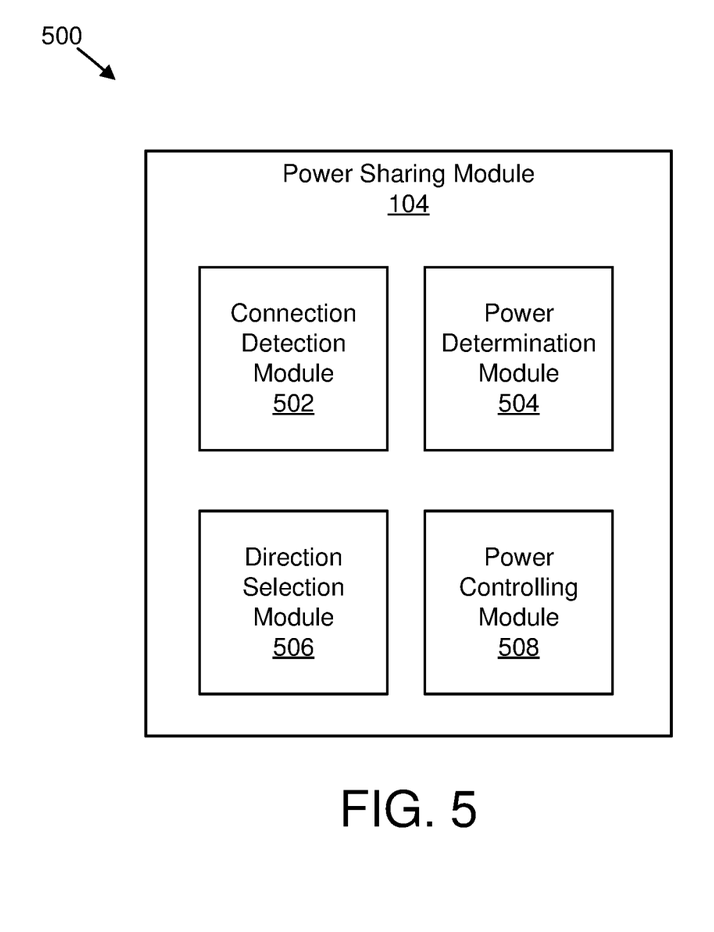
FIG. 5 is a schematic block diagram illustrating one embodiment of an apparatus including a power sharing module.

FIG. 5 depicts a schematic block diagram illustrating one embodiment of an apparatus 500 that includes one embodiment of the power sharing module 104. Furthermore, the power sharing module 104 includes a connection detection module 502, a power determination module 504, a direction selection module 506, and a power controlling module 508.

In various embodiments, the connection detection module 502 is used to detect a USB connection between a first information handling device and a second information handling device. The USB connection may connect a USB port of the first information handling device to a USB port of the second information handling device. Further, the USB connection may be a USB cable that has USB type C connectors on both ends. Moreover, the USB connection may facilitate operation under the USB Power Delivery specification (e.g., USB Power Delivery version 2.0) to enable devices to source (e.g., provide) and/or sink (e.g., consume) power in a dual-role operation. The USB connection may facilitate alternating between sourcing and sinking power. In addition, the USB connection may facilitate power negotiation.

The connection detection module 502 may detect a USB connection at the first information handling device and/or the second information handling device using information transmitted (e.g., communication) between the first information handling device and the second information handling device according to USB specifications. Moreover, the connection detection module 502 may detect that a first USB type C connector is connected to the first information handling device and that a second USB type C connector is connected to the second information handling device. Detecting that a first USB type C connector is connected to the first information handling device and that a second USB type C connector is connected to the second information handling device may be based on information transmitted between the first information handling device and the second information handling device.

In some embodiments, the power determination module 504 is used to determine to provide power between the first information handling device and the second information handling device via the USB connection based on information transmitted between the first information handling device and the second information handling device. The transmitted information between the first information handling device and the second information handling device may include: a request for power from the first information handling device and/or the second information handling device and/or an offer for power from the first information handling device and/or the second information handling device.

The power determination module 504 may receive various information via the USB connection that is analyzed to determine whether to provide power between the first information handling device and the second information handling device, such as: battery level information from the first and/or second information handling device; estimated remaining time of operation information from the first and/or second information handling device; a type of power source of the first and/or second information handling device; a quality of a power source of the first and/or second information handling device; an application running on the first and/or second information handling device; an efficiency of the first and/or second information handling device; a battery cycle count of the first and/or second information handling device; a warranted cycle count of the first and/or second information handling device; a priority difference between the first information handling device and the second information handling device; and charging requirements of the first and/or second information handling device. For example, the power determination module 504 may receive various input information that is analyzed to determine whether to provide power from one information handling device to another information handling device.

Battery level information may indicate a level of charge of a battery or battery system, such as fully charged, high charge, medium charge, low charge, critically low charge, and so forth. Estimated remaining time of operation information may indicate an amount of time of operation of an information handling device based on a remaining battery life without further battery charging, such as a high amount of remaining time, a medium amount of remaining time, a low amount of remaining time, an actual estimated amount of remaining time, and so forth.

A type of power source of an information handling device may indicate if an information handling device is battery powered, plugged in, using grid power, using an alternating current ("AC") power source, using a direct current ("DC") power source, powered directly from a power source, powered indirectly from a power source, powered by connection to another powered device, and so forth. A quality of a power source of an information handling device may indicate whether the power source is a generator, utility grid power, a backup power supply, and so forth.

Whether power is provided from one information handling device to another information handling device may depend on an application running on one of the information handling devices. For example, an information handling device may be used to present a power point presentation using a power point presentation application. If the information handling device presenting the power point presentation runs out of power, the presentation will be delayed. Accordingly, the information handling device presenting the power point presentation may need to receive power from another information handling device to not delay the presentation. Therefore the power determination module 504 may determine that power is to be provided to the information handling device presenting a power point presentation. It should be noted that any suitable application may facilitate determining to provide power to an information handling device, such as a word processing application, an operating system application, a spreadsheet application, a power point presentation application, a gaming application, a management application, a business application, and so forth.

An efficiency of a power supply of an information handling device may be used by the power determination module 504 so that the power determination module 504 optimizes use of the power supply based on an efficiency curve. A battery cycle count of an information handling device may indicate a number of times that a battery has been charged and/or discharged. The power determination module 504 may use the battery cycle count to determine whether a battery should provide and/or receive power. A warranted cycle count of an information handling device may indicate a number of times that a battery is warranted to be charged and/or discharged. The power determination module 504 may use the warranted cycle count to determine whether a battery should provide and/or receive power.

An information handling device may have a priority assigned to it. For example, information handling devices that are medical devices may have a higher priority than non-medical devices. As another example, an information handling device used by one person may have a higher priority than an information handling device used by another person, such as based on a person's position in a company. Accordingly, the power determination module 504 may determine to provide power to an information handling device based on a priority difference between the first information handling device and the second information handling device.

Charging requirements may vary between information handling devices. For example, charging requirements may be estimated to determine when an information handling device needs to be charged, how long it will take an information handling device to charge, times during which an information handling device can be charged, and so forth.

The power determination module 504, in one embodiment, may automatically (e.g., without human selection, without user selection, without human input) determine whether an information handling device needs power and may automatically determine to provide power to the information handling device that needs power. In another embodiment, the power determination module 504 may automatically determine whether an information handling device needs power and may prompt a user of an information handling device that is to provide power to select whether to provide power to another information handling device.

The power determination module 504, in certain embodiments, may determine conditional criteria for providing power between information handling devices. For example, the power determination module 504 may determine an action to be performed by an information handling device before that information handling device receives power from another information handling device. The action to be performed by the information handling device may include any suitable action, such as throttling a processor, turning off one or more components of the information handling device (e.g., turning off a general processing unit), and so forth.

In one embodiment, the direction selection module 506 is used to select a direction to provide power between the first information handling device and the second information handling device based on the information transmitted between the first information handling device and the second information handling device. In one embodiment, the direction selection module 506 may select to provide power in the direction from the first information handling device to the second information handling device. In another embodiment, the direction selection module 506 may select to provide power in the direction from the second information handling device to the first information handling device. The direction selection module 506 may interact with the power determination module 504 to determine a direction to provide power between the first information handling device and the second information handling device.

In certain embodiments, the power controlling module 508 is used to control power to be provided between the first information handling device and the second information handling device after determining to provide power and selecting the direction to provide power. In one embodiment, the power controlling module 508 configures the first and/or second information handling devices for providing power. For example, the power controlling module 508 may perform the necessary USB power delivery protocol requests and configurations in order to provide power between the first and second information handling devices.

Figure 6:
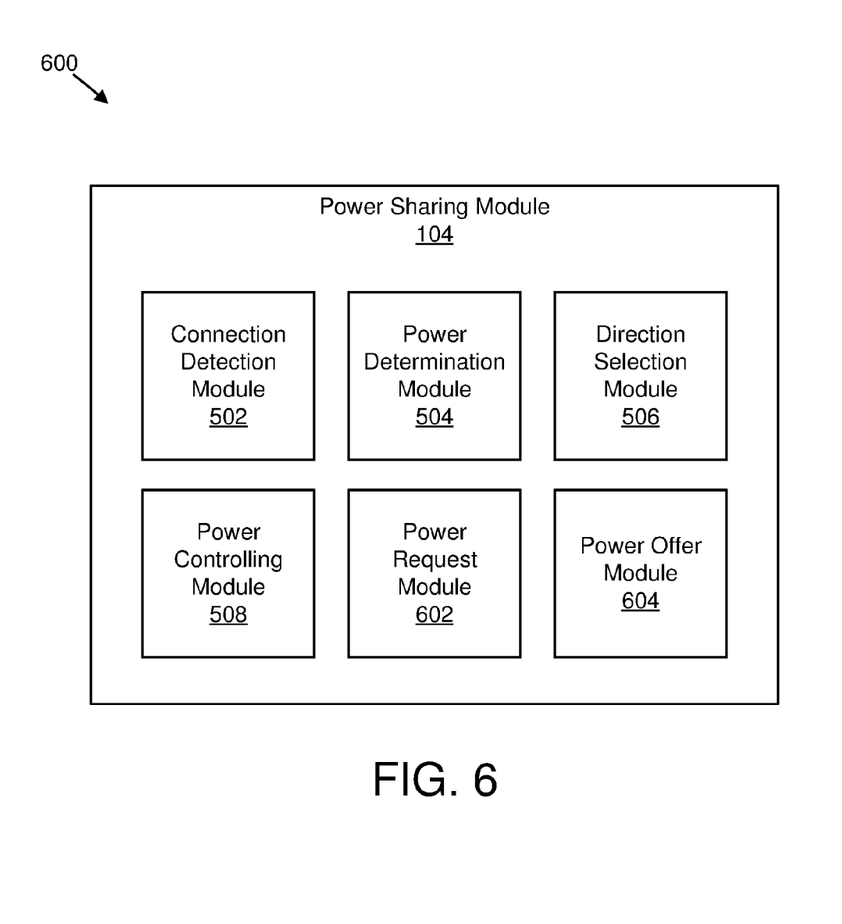
FIG. 6 is a schematic block diagram illustrating another embodiment of an apparatus including a power sharing module.

FIG. 6 is a schematic block diagram illustrating another embodiment of an apparatus 600 that includes one embodiment of the power sharing module 104. Furthermore, the power sharing module 104 includes one embodiment of the connection detection module 502, the power determination module 504, the direction selection module 506, and the power controlling module 508, that may be substantially similar to the connection detection module 502, the power determination module 504, the direction selection module 506, and the power controlling module 508 described in relation to FIG. 5. The power sharing module 104 also includes a power request module 602 and a power offer module 604.

In certain embodiments, the power request module 602 is used to transmit and/or receive a request for power from an information handling device. In one embodiment, the power request module 602 enables a user to request power from an information handling device. In some embodiments, the power request module 602 receives a request for power from an information handling device. In various embodiments, the power request module 602 automatically requests power from another device after the power determination module 504 determines that an information handling device needs power.

In some embodiments, the power offer module 604 is used to transmit and/or receive an offer for power from an information handling device. In one embodiment, the power offer module 604 enables a user to offer power from an information handling device. In some embodiments, the power offer module 604 receives an offer for power from an information handling device. In various embodiments, the power offer module 604 automatically offers power from an information handling device after the power determination module 504 determines that an information handling device can provide power.

Figure 7:
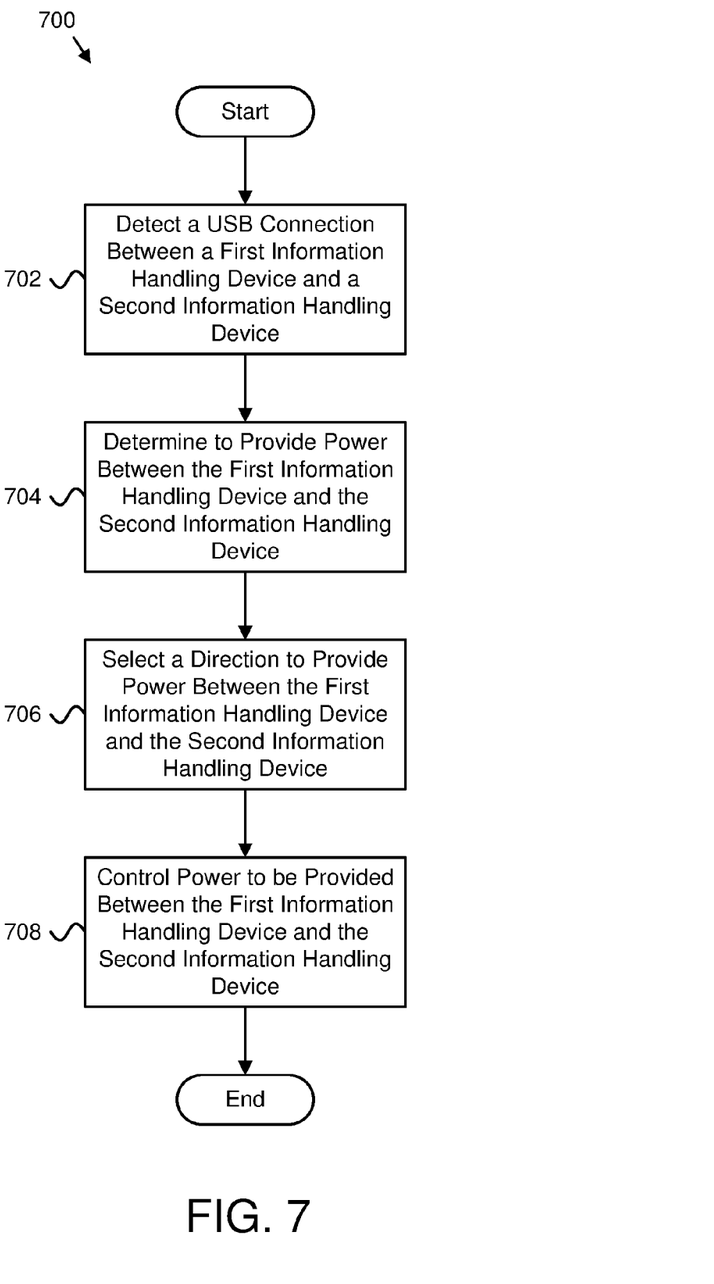
FIG. 7 is a schematic flow chart diagram illustrating an embodiment of a method for powering a device using a USB connection.

FIG. 7 is a schematic flow chart diagram illustrating an embodiment of a method 700 for powering a device using a USB connection. In some embodiments, the method 700 is performed by an apparatus, such as the information handling device 102. In other embodiments, the method 700 may be performed by a module, such as the power sharing module 104. In certain embodiments, the method 700 may be performed by a processor executing program code, for example, a microcontroller, a microprocessor, a CPU, a GPU, an auxiliary processing unit, a FPGA, or the like.

The method 700 may include detecting 702 a USB connection between a first information handling device and a second information handling device. In certain embodiments, the connection detection module 502 may detect 702 a USB connection between a first information handling device and a second information handling device.

The method 700 may also include determining 704 to provide power between the first information handling device and the second information handling device via the USB connection based on information transmitted between the first information handling device and the second information handling device. In certain embodiments, the power determination module 504 may determine 704 to provide power between the first information handling device and the second information handling device via the USB connection based on information transmitted between the first information handling device and the second information handling device. In one embodiment, determining 704 to provide power between the first information handling device and the second information handling device via the USB connection includes receiving a request for power from the first information handling device.

In some embodiments, determining 704 to provide power between the first information handling device and the second information handling device via the USB connection includes receiving an offer for power from the first information handling device. In various embodiments, determining 704 to provide power between the first information handling device and the second information handling device via the USB connection includes detecting a low battery level of the first information handling device.

In certain embodiments, determining 704 to provide power between the first information handling device and the second information handling device via the USB connection includes detecting a low estimated remaining time of operation of the first information handling device. In one embodiment, determining 704 to provide power between the first information handling device and the second information handling device via the USB connection includes determining a type of power source of the first information handling device. In some embodiments, determining 704 to provide power between the first information handling device and the second information handling device via the USB connection includes determining an application running on the first information handling device. In various embodiments, determining 704 to provide power between the first information handling device and the second information handling device via the USB connection includes determining an efficiency of the first information handling device.

In some embodiments, determining 704 to provide power between the first information handling device and the second information handling device via the USB connection includes determining a battery cycle count and warranted cycle count of the first information handling device. In certain embodiments, determining 704 to provide power between the first information handling device and the second information handling device via the USB connection includes determining a priority difference between the first information handling device and the second information handling device. In various embodiments, determining 704 to provide power between the first information handling device and the second information handling device via the USB connection includes determining charging requirements of the first information handling device.

The method 700 may select 706 a direction to provide power between the first information handling device and the second information handling device based on the information transmitted between the first information handling device and the second information handling device. In one embodiment, the direction selection module 506 may select 706 the direction to provide power between the first information handling device and the second information handling device based on the information transmitted between the first information handling device and the second information handling device. In some embodiments, selecting 706 the direction to provide power between the first information handling device and the second information handling device includes selecting to provide power in the direction from the first information handling device to the second information handling device. In various embodiments, selecting 706 the direction to provide power between the first information handling device and the second information handling device includes selecting to provide power in the direction from the second information handling device to the first information handling device.

The method 700 may control 708 power to be provided between the first information handling device and the second information handling device after determining to provide power and selecting the direction to provide power, and the method 700 may end. In one embodiment, the power controlling module 508 may control 708 power to be provided between the first information handling device and the second information handling device after determining to provide power and selecting the direction to provide power. In certain embodiments, controlling 708 power to be provided between the first information handling device and the second information handling device includes configuring the first and second information handling devices for providing power.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a processor;
  a memory that stores code executable by the processor to:
    detect a universal serial bus ("USB") connection between a first information handling device and a second information handling device;
    determine, without human input, to provide power between the first information handling device and the second information handling device via the USB connection based on information transmitted between the first information handling device and the second information handling device, wherein the information transmitted between the first information handling device and the second information handling device comprises information selected from the group consisting of a type of power source, a running application, a battery cycle count, and a warranted cycle count;
    select, without human input, a direction to provide power between the first information handling device and the second information handling device based on the information transmitted between the first information handling device and the second information handling device; and
    control power to be provided between the first information handling device and the second information handling device after determining to provide power and selecting the direction to provide power.

2. The apparatus of claim 1, wherein the code executable by the processor determines to provide power between the first information handling device and the second information handling device via the USB connection by detecting a low battery level of the first information handling device.

3. The apparatus of claim 1, wherein the code executable by the processor determines to provide power between the first information handling device and the second information handling device via the USB connection by determining charging requirements of the first information handling device.

4. The apparatus of claim 1, wherein the code executable by the processor selects to provide power in the direction from the first information handling device to the second information handling device.

5. The apparatus of claim 1, wherein the code executable by the processor selects to provide power in the direction from the second information handling device to the first information handling device.

6. A method comprising:
    detecting, by use of a processor, a universal serial bus ("USB") connection between a first information handling device and a second information handling device;
    determining, without human input, to provide power between the first information handling device and the second information handling device via the USB connection based on information transmitted between the first information handling device and the second information handling device, wherein the information transmitted between the first information handling device and the second information handling device comprises information selected from the group consisting of a type of power source, a running application, a battery cycle count, and a warranted cycle count;
    selecting, without human input, a direction to provide power between the first information handling device and the second information handling device based on the information transmitted between the first information handling device and the second information handling device; and
    controlling power to be provided between the first information handling device and the second information handling device after determining to provide power and selecting the direction to provide power.

7. The method of claim 6, wherein determining to provide power between the first information handling device and the second information handling device via the USB connection comprises detecting a low battery level of the first information handling device.

8. The method of claim 6, wherein determining to provide power between the first information handling device and the second information handling device via the USB connection comprises detecting a low estimated remaining time of operation of the first information handling device.

9. The method of claim 6, wherein determining to provide power between the first information handling device and the second information handling device via the USB connection comprises determining the type of power source of the first information handling device.

10. The method of claim 6, wherein determining to provide power between the first information handling device and the second information handling device via the USB connection comprises determining the running application on the first information handling device.

11. The method of claim 6, wherein determining to provide power between the first information handling device and the second information handling device via the USB connection comprises determining the efficiency of the first information handling device.

12. The method of claim 6, wherein determining to provide power between the first information handling device and the second information handling device via the USB connection comprises determining the battery cycle count and the warranted cycle count of the first information handling device.

13. The method of claim 6, wherein determining to provide power between the first information handling device and the second information handling device via the USB connection comprises determining a priority difference between the first information handling device and the second information handling device.

14. The method of claim 6, wherein determining to provide power between the first information handling device and the second information handling device via the USB connection comprises determining charging requirements of the first information handling device.

15. The method of claim 6, wherein selecting the direction to provide power between the first information handling device and the second information handling device comprises selecting to provide power in the direction from the first information handling device to the second information handling device.

16. The method of claim 6, wherein selecting the direction to provide power between the first information handling device and the second information handling device comprises selecting to provide power in the direction from the second information handling device to the first information handling device.

17. The method of claim 6, wherein controlling power to be provided between the first information handling device and the second information handling device comprises configuring the first and second information handling devices for providing power.

18. The method of claim 6, wherein determining to provide power between the first information handling device and the second information handling device via the USB connection comprises determining conditional criteria for providing power between the first information handling device and the second information handling device.

19. The method of claim 18, wherein determining the conditional criteria for providing power between the first information handling device and the second information handling device comprises determining an action to be performed on the first information handling device before the second information handling device will provide power to the first information handling device.

20. A program product comprising a non-transitory computer readable storage medium that stores code executable by a processor, the executable code comprising code to perform:
    detecting a universal serial bus ("USB") connection between a first information handling device and a second information handling device;
    determining, without human input, to provide power between the first information handling device and the second information handling device via the USB connection based on information transmitted between the first information handling device and the second information handling device, wherein the information transmitted between the first information handling device and the second information handling device comprises information selected from the group consisting of a type of power source, a running application, a battery cycle count, and a warranted cycle count;
    selecting, without human input, a direction to provide power between the first information handling device and the second information handling device based on the information transmitted between the first information handling device and the second information handling device; and controlling power to be provided between the first information handling device and the second information handling device after determining to provide power and selecting the direction to provide power.

* * * * *